United States Patent
Lee et al.

(10) Patent No.: US 11,783,469 B2
(45) Date of Patent: *Oct. 10, 2023

(54) METHOD AND SYSTEM FOR SCANNING WAFER

(71) Applicant: TAIWAN SEMICONDUCTOR MANUFACTURING COMPANY LTD., Hsinchu (TW)

(72) Inventors: Pei-Hsuan Lee, Taipei (TW);
Chien-Hsiang Huang, Hsinchu (TW);
Kuang-Shing Chen, Hsinchu (TW);
Kuan-Hsin Chen, Hsinchu (TW);
Chun-Chieh Chin, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 186 days.

This patent is subject to a terminal disclaimer.

(21) Appl. No.: 17/346,160

(22) Filed: Jun. 11, 2021

(65) Prior Publication Data
US 2021/0304397 A1 Sep. 30, 2021

Related U.S. Application Data

(63) Continuation of application No. 16/285,765, filed on Feb. 26, 2019, now Pat. No. 11,037,289.

(60) Provisional application No. 62/751,047, filed on Oct. 26, 2018.

(51) Int. Cl.
*G06T 7/70* (2017.01)
*G06T 7/00* (2017.01)

(52) U.S. Cl.
CPC .............. *G06T 7/0006* (2013.01); *G06T 7/70* (2017.01); *G06T 2207/10061* (2013.01); *G06T 2207/20081* (2013.01); *G06T 2207/30148* (2013.01); *G06T 2207/30204* (2013.01)

(58) Field of Classification Search
CPC ................................ G06T 7/0006; G06T 7/70
USPC ......................................................... 382/149
See application file for complete search history.

(56) References Cited

U.S. PATENT DOCUMENTS

2008/0100844 A1* 5/2008 Sali ................... G01N 21/95607
356/394

* cited by examiner

*Primary Examiner* — Stephen P Coleman
(74) *Attorney, Agent, or Firm* — WPAT LAW; Anthony King

(57) ABSTRACT

The present disclosure provides a method and a system for scanning wafer. The system captures a defect image of a wafer, and generates a reference image corresponding to the first defect image based on a reference image generation model. The system generates a defect marked image based on the defect image and the reference image.

20 Claims, 15 Drawing Sheets

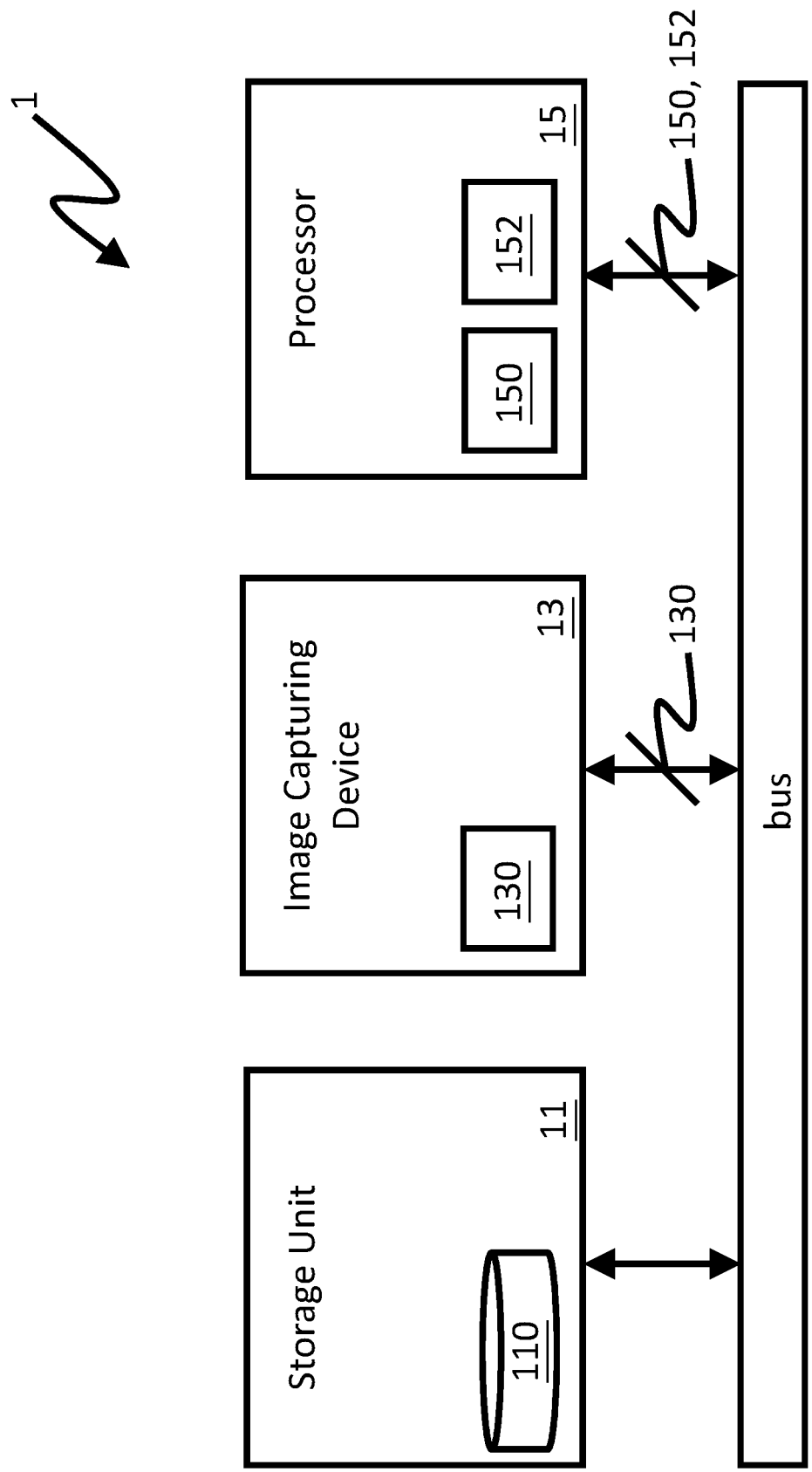

METHOD AND SYSTEM FOR SCANNING WAFER

PRIORITY CLAIM AND CROSS-REFERENCE

This patent application is a continuation of U.S. patent application Ser. No. 16/285,765 filed on Feb. 26, 2019, entitled of "METHOD AND SYSTEM FOR SCANNING WAFER", which claims the benefit of U.S. Provisional Patent Application Ser. No. 62/751,047 filed on Oct. 26, 2018, the entire disclosure of which is hereby incorporated by reference.

BACKGROUND

Scanning Electron Microscope (SEM) is extensively used for analyzing defect of semiconductor wafer. Further, Review SEM (RSEM) is correspondingly developed for revealing the defect of semiconductor wafer more precisely. Since image captures via RSEM may be time consuming and accuracy of determining the type of the defect on the wafer may be imprecise, the Wafer Per Hour (WPH) and accuracy of Auto Defect Classification (ADC) are limited.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 1A is a block diagram of a system, in accordance with some embodiments of the present disclosure.

DETAILED DESCRIPTION

Figure 1B:
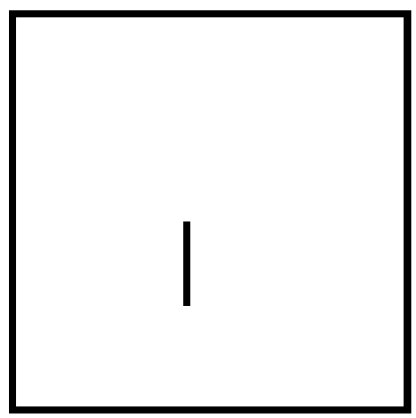
FIG. 1B is a schematic view illustrating images, in accordance with some embodiments of the present disclosure.
Figure 1B:
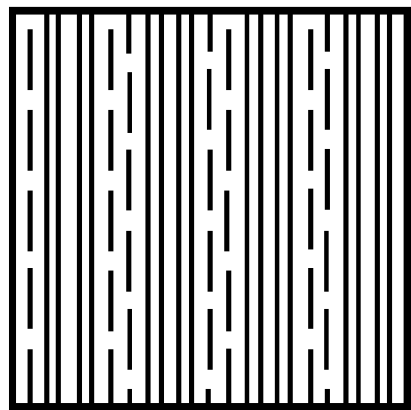
Figure 1B:
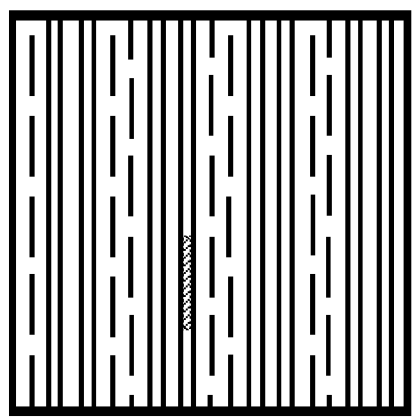

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

Referring to FIG. 1A to FIG. 1B for some embodiments of the present disclosure, FIG. 1A is a block diagram of a system 1 for scanning wafer of some embodiments, and FIG. 1B is a schematic view illustrating relative images of some embodiments. The system 1 includes a storage unit 11, an image capturing device 13 and a processor 15. In the present embodiment, the storage unit 11 stores a reference image generation model 110, which includes a trained model. The storage unit 11, the image capturing device 13 and the processor 15 are electrically connected (e.g., electrically connected via bus), and the interactions therebetween will be further described hereinafter.

As shown in FIGS. 1A and 1B, the image capturing device 13 is configured to capture a defect image 130 of a wafer. The defect image 130 contains information of a defect on the wafer. In some embodiments, the defect may be scratch mark, crack, residue, short circuitry, bridging, etc. on the wafer. After capturing of the defect image 130 by the image capturing device 13, the processor 15 generates a reference image 150 based on the defect image 130 and the reference image generation model 110. Subsequently, based on the defect image 130 (i.e., image representing defect of wafer) and the reference image 150, the processor 15 generates a defect marked image 152. In some embodiments, the processor 15 subtracts the defect image 130 from the reference image 150 for generating the defect marked image 152.

In some embodiments, because the reference image 150 is generated directly from the trained model (i.e., the reference image generation model 110), redundant time for capturing reference image is saved. In addition, an operator can choose an appropriate Auto Defect Classification (ADC) tool for classifying the type of the defect on the wafer thereafter. It should be noted that, the mentioned trained model is trained based on a machine learning scheme with relevant training data. The details of training the model will be described below (e.g., the embodiments of training models by system 3).

Figure 2A:
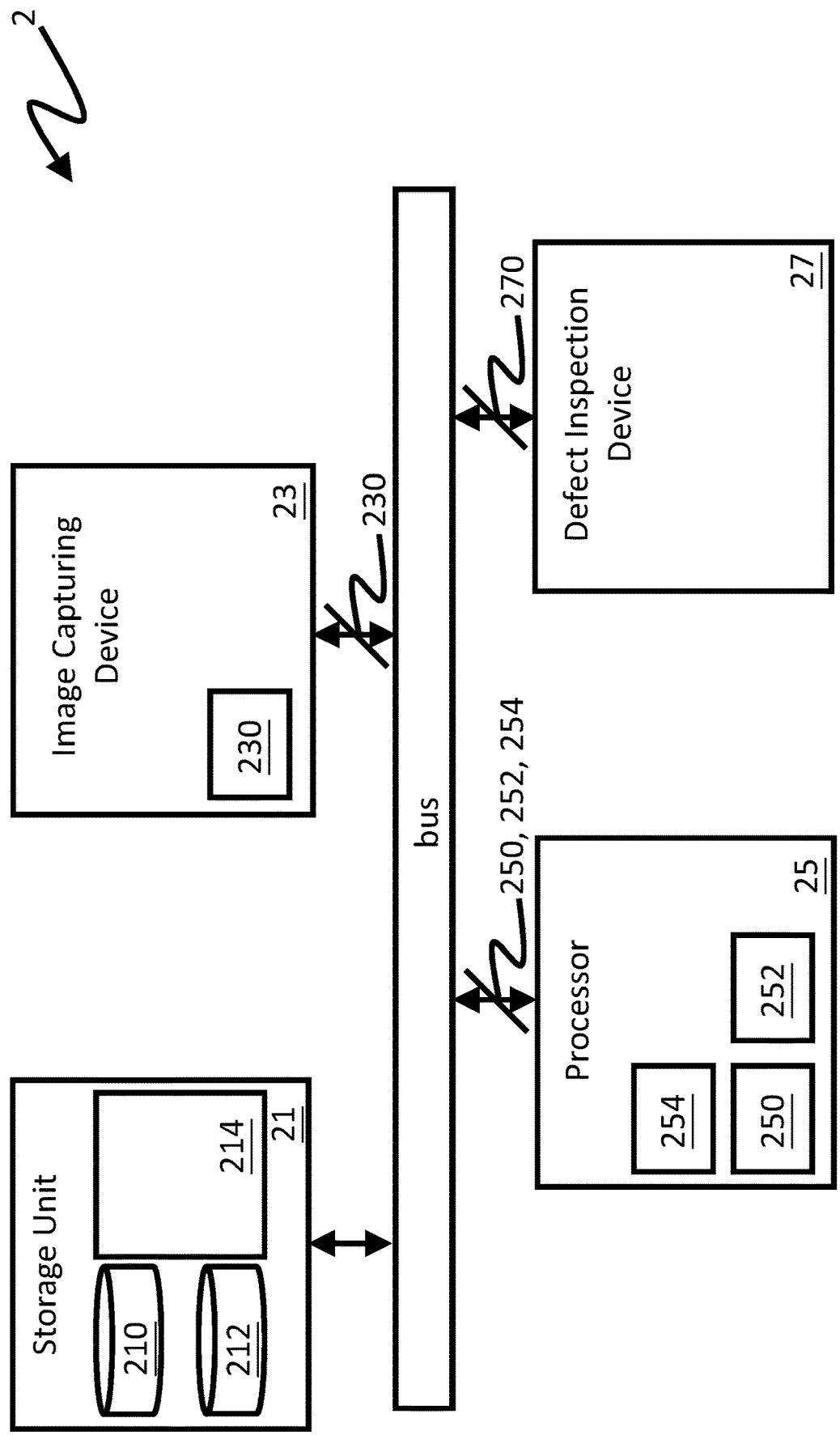
FIG. 2A is a block diagram of another system, in accordance with some embodiments of the present disclosure.
Figure 2B:
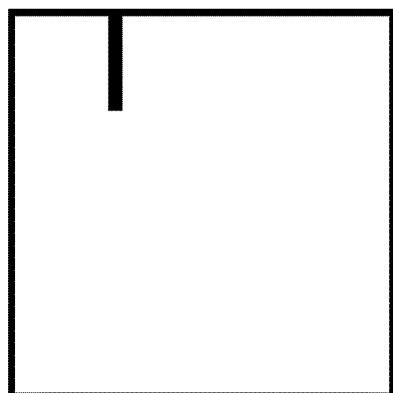
FIG. 2B is a schematic view illustrating images, in accordance with some embodiments of the present disclosure.
Figure 2B:
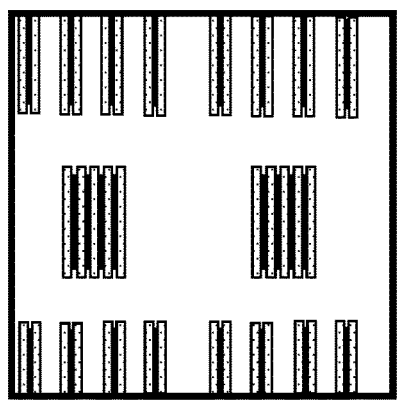
Figure 2B:
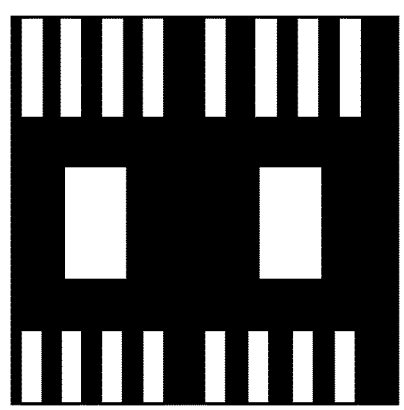
Figure 2B:
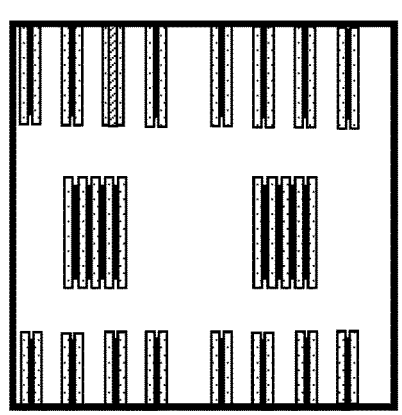

Please refer to FIG. 2A to FIG. 2B for some embodiments of the present disclosure. FIG. 2A is a block diagram of a system 2 for scanning wafer of some embodiments. FIG. 2B is a schematic view illustrating relative images of some embodiments. The system 2 includes a storage unit 21, an image capturing device 23, a processor 25 and a defect inspection device 27. The storage unit 21 stores a reference image generation model 210, a defect determination model 212 and a design pattern data 214.

The storage unit 21, the image capturing device 23, the processor 25 and the defect inspection device 27 are electrically connected (e.g., electrically connected via bus). It should be noted that, in some embodiments, the reference image generation model 210 and the defect determination model 212 are trained models, and the design pattern data 214 contains data of a design layout of a wafer (e.g., a design layout of the wafer in computer-aided drawing (CAD) format).

At the beginning of detecting a wafer, the defect inspection device 27 scans the wafer for possible defects. In some embodiments, when a defect is detected by the defect inspection device 27, the defect inspection device 27 determines a position 270 of the defect on the wafer (e.g., coordinates of the defect on the wafer). Subsequently, based on the position 270 of the defect on the wafer determined by the defect inspection device 27, the image capturing device 23 captures a defect image 230, which represents the defect of the wafer.

In some embodiments, the defect inspection device 27 is an optical inspection device configured to scan wafer and detect defect on wafer by comparing optical images of adjacent dies on wafer. In detail, for each die to be inspected on the wafer, the defect inspection device 27 captures a first optical image of the inspected die by light beam or electron beam. The defect inspection device 27 then captures a second optical image of a reference die, which has the same pattern as the inspected die and is adjacent to the inspected die, by light beam or electron beam. The defect inspection device 27 subtracts the first optical image from the second optical image for deriving a subtracted image. If there is no defect on the inspected die, the inspected die and the reference die have the same pattern. Therefore, the values of the pixels of the subtracted image equal to zero. In contrast, when the pixels of the subtracted images contain non-zero value, there may be a defect on the inspected die. The defect inspection device 27 may determine that there is a defect on the inspected die. The defect inspection device 27 can derive and record the position of the defect based on position of the inspected die and the content of the subtracted image.

A reference image corresponding to the defect image 230 may be used for assisting in generating a defect marked image. Therefore, a reference image is generated first. In an embodiment, because the defect image 230 illustrates a part of the wafer where the defect exists, an image matching this part of the wafer may be created for generating a reference image.

The design pattern data 214 contains the data of the entire design layout of a wafer. The processor 25 is capable of determining a design pattern image 254 based on the defect image 230 and the design pattern data 214. The design pattern image 254 and the defect image 230 are images at the same region of the wafer. The design pattern image 254 is the design layout, and the defect image 230 is an image captured by a device.

In some implementations, since the design pattern data 214, the position 270 of the defect and the defect image 230 of a part of the wafer are known data, the design pattern image 254 corresponding to the defect image 230 can be determined via Maximum Cross-Correlation algorithm as described below.

In some implementations, a 4 μm*4 μm field of view (FOV) image with pixel size 1 nm is clipped from a CAD layout (e.g., the design pattern data 214) of wafer at coordinates (e.g., the position 270 of the defect) of an 1 μm*1 μm real SEM image with pixel size 1 nm (e.g., the defect image 230), and the 1 μm*1 μm real SEM image is transferred from 8-bit to binary format using proper gray level threshold (e.g., pixels with higher gray level than a threshold may be 1 and the others may be 0) or edge detection algorithm.

Next, the 1 μm*1 μm real SEM image is overlapped with the 4 μm*4 μm FOV image in different locations of the 4 μm*4 μm FOV image, and matched pixel numbers are calculated. In detail, the 1 μm*1 μm real SEM image is shifted step-by-step in both X and Y directions from the lower left of the 4 μm*4 μm FOV image, and matched pixel numbers at different locations of the 4 μm*4 μm FOV image are calculated.

The location with the maximal matched pixel number is determined as the maximum correlation location, and an 1 μm*1 μm FOV image (e.g., the design pattern image 254) clipped at the maximum correlation location may be the same location where the 1 μm*1 μm real SEM image is captured. In other words, the clipped 1 μm*1 μm FOV image and the 1 μm*1 μm real SEM image represent the same region of the wafer while the clipped 1 μm*1 μm FOV image is a design layout and the 1 μm*1 μm real SEM image is an image captured by a device.

How to find the correlation between different data based on Maximum Cross-Correlation algorithm shall be appreciated by those skilled in the art based on the above disclosure, and thus will not be further described herein.

After determining the design pattern image 254, the processor 25 generates a reference image 250. In an embodiment, the processor 25 converts the design pattern image 254 into the reference image 250 by the reference image generation model 210. In other words, the processor 25 inputs the design pattern image 254 to the reference image generation model 210 for deriving the reference image 250 as output data from the reference image generation model 210. Further, the reference image generation model 210 is a trained machine learning model, that is a data is inputted and subsequently another data is outputted. In this embodiment, the design pattern image 254 is the input data for the reference image generation model 210, and the subsequent output data from the reference image generation model 210 is the reference image 250.

After generating the reference image 250, the processor 25 generates a defect marked image 252 based on the defect image 230 and the reference image 250. In some embodiments, the defect determination model 212 is introduced for obtaining information of the defect by a machine learning scheme. In detail, input for the defect determination model 212 is the defect marked image 252, and the output from the defect determination model 212 is information of the defect. In other words, the processor 250 generates information of the defect of the wafer based on the defect marked image 252 and the defect determination model 212. In an embodiment, the processor 25 converts the defect marked image 252 into the information of the defect by the defect determination model 212. The information of the defect may contain user classification codes of defect.

Similarly, the defect determination model 212 is a trained machine learning model, that a data is inputted to the defect determination model 212, and subsequently another data is outputted from the defect determination model 212 based on the inputted data. In some embodiments, the defect marked image 252 is given as the input data for the defect determination model 212, and the subsequent output data is the information of the defect.

In some embodiments, since the reference image 250 is generated directly by a trained model, redundant time for capturing reference image is saved. Further, because the information of the defect is obtained based on another trained model, the procedure of ADC for classifying the type of the defect on the wafer can be more precise and reliable. It should be noted that, the mentioned trained models are trained based on a machine learning scheme with relevant training data. The details of training the models will be further described below (e.g., the embodiments of training models by system 3).

Figure 3A:
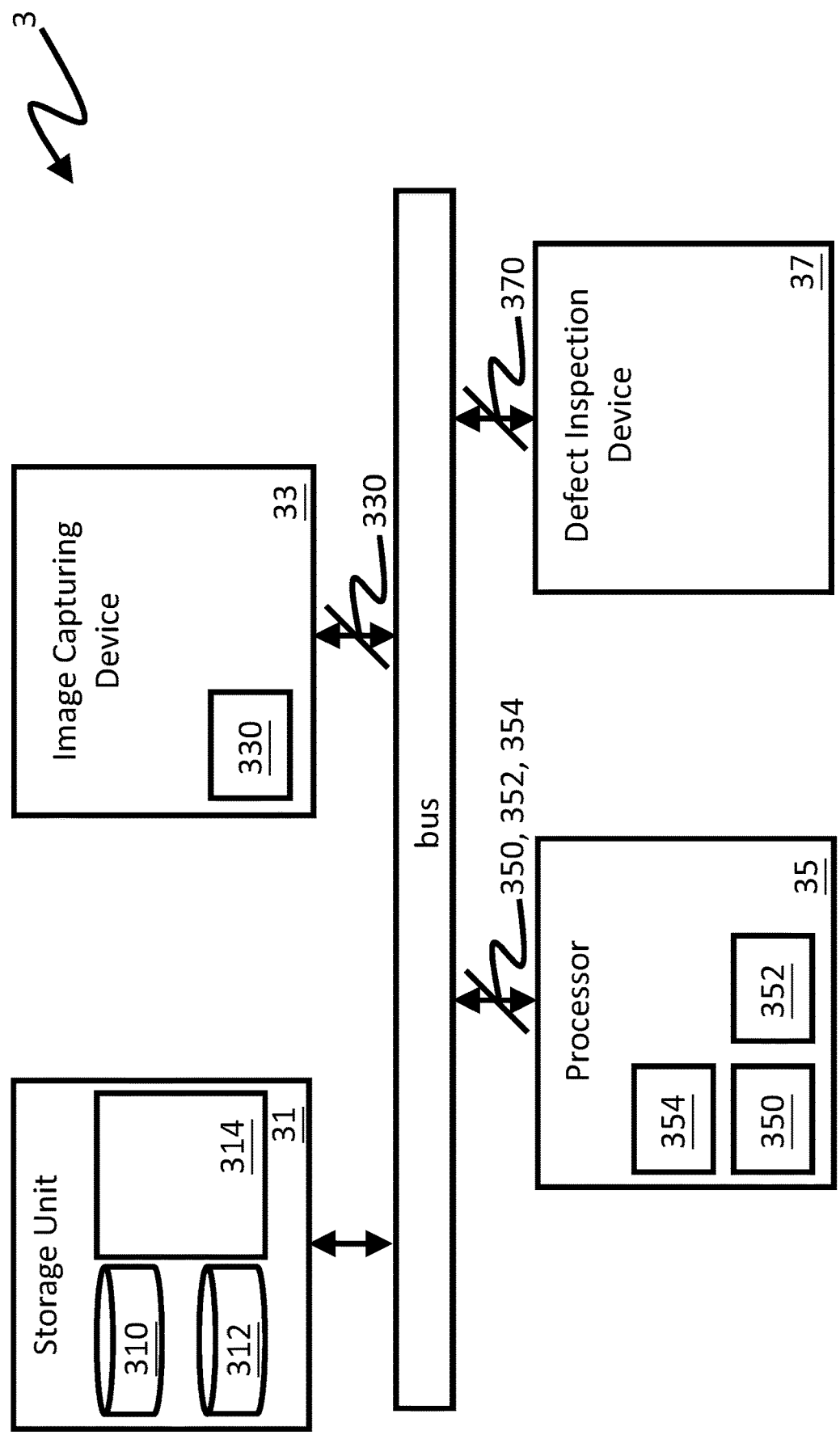
FIG. 3A is a block diagram of another system, in accordance with some embodiments of the present disclosure.
Figure 3B:
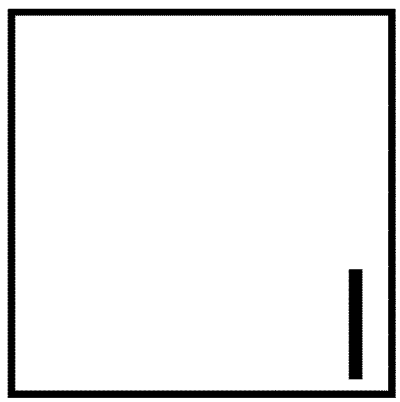
FIG. 3B is a schematic view illustrating images, in accordance with some embodiments of the present disclosure.
Figure 3B:
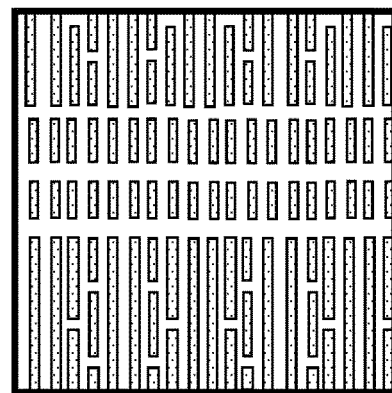
Figure 3B:
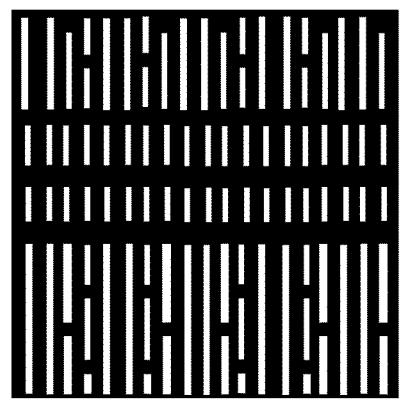
Figure 3B:
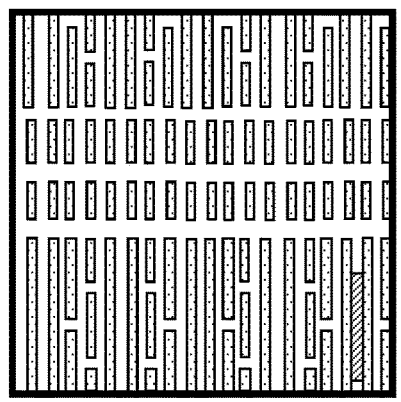

Referring to FIG. 3A and FIG. 3B for some embodiments of the present disclosure, FIG. 3A is a block diagram of a system 3 for scanning wafer of some embodiments, and FIG. 3B is a schematic view illustrating relative images of some embodiments. The system 3 includes a storage unit 31, an image capturing device 33, a processor 35 and a defect inspection device 37. The storage unit 31, the image capturing device 33, the processor 35 and the defect inspection device 37 are electrically connected (e.g., electrically connected via bus). More details of establishing machine learning models and determining the defect of wafer will be further described hereinafter.

Before put to use, machine learning models of the disclosure may be trained first. In detail, in some embodiments, reference image generation model is configured to convert a predetermined design pattern image (not shown) into a predetermined reference image (not shown), so that a reference image generation model 310 is established based on at least one predetermined design pattern image (not shown) and at least one predetermined reference image (not shown) corresponding to the at least one predetermined design pattern image. The at least one predetermined design pattern image is used as input data at training stage and the at least one predetermined reference image is output data at training stage.

It should be noted that the at least one predetermined reference image used for training the reference image generation model 310 in some embodiments is an image captured by a device and corresponding to the predetermined design pattern image. After establishment of the reference image generation model 310 by the processor 35, the storage unit 31 stores the reference image generation model 310 for later use.

In some implementations, the reference image generation model 310 can be trained with design pattern images and corresponding reference images via U-net algorithm, Generative Adversarial Network (GAN) algorithm or Autoencoder algorithm.

In the implementation of U-net algorithm, there is a training function (e.g., trainUnet.ipynb of Unet from GitHub) for training model. The training function includes a section (e.g., "trainGenerator(2, '/membrane/train', 'image', 'label', data_gen_args, save_to_dir=None" of trainUnet.ipynb) for receiving two sets of images. The two sets of images include a set of input images for training (e.g., 30 pieces of the design pattern images of the present disclosure put in a first folder based on trainUnet.ipynb) and a set of output images based on the set of the input images (e.g., 30 pieces of the real reference images corresponding to the design pattern images of the present disclosure put in another folder based on trainUnet.ipynb).

Accordingly, a machine learning model (e.g., the reference image generation model of the present disclosure) for converting input images (e.g., design pattern image of the present disclosure) into output images (e.g., reference image of the present disclosure) is trained after the training function is executed with a main program containing the contraction and expansion functions for the images.

How to establish machine learning models (i.e., the reference image generation model of the disclosure in some embodiments) with design pattern images and reference images based on U-net algorithm, GAN algorithm or Autoencoder algorithm shall be appreciated by those skilled in the art based on the above disclosure, and thus will not be further described herein.

In some embodiments, a defect determination model is configured to convert a predetermined defect marked image (not shown) into predetermined information of a defect, so that a defect determination model 312 is established based on at least one predetermined defect marked image (not shown) and predetermined information of defect corresponding to the at least one predetermined defect marked image.

In other words, upon training the defect determination model 312, the at least one predetermined defect marked image is input data, and the predetermined information of defect corresponding to the at least one predetermined defect marked image is output label. After the establishment of the defect determination model 312, the storage unit 31 stores the defect determination model 312 for later use.

Furthermore, in some implementations, the defect determination model 312 can be trained with defect marked images and information of defect via You Only Look Once version 3 (YOLOv3) algorithm, Single Shot multiBox Detection (SSD) algorithm or Regions with Convolutional Neural Network (R-CNN) algorithm.

In the implementation of YOLOv3 algorithm based on a Darknet53 backend network structure, there is a training function for training model. The training function includes a section for receiving input images for training and output labels based on the input images (e.g., 30 pieces of the images with marked defect for each label). Accordingly, after about 100 times of training, a machine learning model (e.g., the information of the defect of the present disclosure) is trained after the training function is executed with a main program.

How to establish a machine learning model (i.e., the defect determination model in some embodiments) by defect images, reference images and defect marked images based on YOLOv3 algorithm, SSD algorithm or R-CNN algorithm shall be appreciated by those skilled in the art based on the above disclosure, and thus will not be further described herein.

After training the reference image generation model 310 and the defect determination model 312 with sufficient data, the reference image generation model 310 and the defect determination model 312 are established. The system 3 can determine defect on wafer based on the techniques of machine learning. Particularly, the defect inspection device 37 scans a wafer for possible defect. In some embodiments, a defect is detected by the defect inspection device 37, and then the defect inspection device 37 determines a position 370 of the defect (e.g., coordinates of the defect). Since the position 370 of the defect on the wafer is determined, the image capturing device 33 is capable of capturing a defect image 330 containing the defect of the wafer according to the position 370.

The processor 35 determines a design pattern image 354 corresponding to the defect image 330 based on design pattern data 314 (e.g., design layout of a wafer stored in the storage unit 31). Then, the processor 35 converts the design pattern image 354 into a reference image 350 by the reference image generation model 310. The design pattern image 354 is given as the input data for the reference image generation model 310 and the subsequent output data is the reference image 350.

After generating the reference image 350, the processor 35 generates a defect marked image 352 based on the defect image 330 and the reference image 350. In some embodiments, the processor 35 converts the defect marked image 352 into information of the defect of the wafer based on the defect determination model 312. The defect marked image 352 is given as the input data for the defect determination model 312, and the subsequent output data is the information of the defect of the wafer.

Therefore, in some embodiments, the reference image generation model 310 and the defect determination model 312 are trained as machine learning model, so that the reference image 350 and the information such as the user classification codes of defect can be generated directly. Accordingly, redundant time for capturing reference image is saved, and the procedure of ADC for classifying the type of the defect on the wafer can be more precise and reliable.

In addition, in some embodiments, there is another training function for the system 3 to train reference image generation model. The training function includes a section for receiving one group of image histogram data and two groups of images. In detail, the two groups of images are input images for training and the output images based on the input images. Each image of the training output images has its own image histogram data. The image histogram data of the training output images form the group of image histogram data as training input histogram data.

Accordingly, the reference image generation model for converting input images (e.g., design pattern image of the present disclosure) with image histogram data of the captured images (e.g., image histogram data of defect image of the present disclosure) into output images (e.g., reference image of the present disclosure) is trained after the training function is executed with a main program containing the contraction and expansion functions for the images.

In other words, after establishing the reference image generation model 310, the reference image generation model 310 can be applied to a design pattern data 314 and an image histogram data of the defect image 330 to generate a reference image 350 accordingly. It should be noted that training the model with the image histogram data of the output image improves the quality of the output image adapting to a real image since the image histogram data contains information of graphical representation of tonal distribution in corresponding image.

Moreover, in some embodiments, there is another training function for the system 3 to train defect determination model. Before training the model, input data for training is prepared. In each set of the input data, there are a defect marked image, a first grayscale image and a second grayscale image. The defect marked image is derived by subtracting a defect image from a reference image corresponding to the defect image. The first grayscale image and the second grayscale image are single channel images captured with the defect image.

In detail, upon capturing a defect on a wafer, several detectors are introduced for obtaining the defect image and additional images. In some embodiments, the defect image is obtained by an overhead detector of the image capturing device, which is located right above the wafer. The additional images are obtained by side detectors of the image capturing device, which are around the overhead detector. Each of the defect image and the additional images has single image channel (i.e., single image component), and each of the defect image and the additional images is grayscale image. The defect image and the additional images are in the same size and have the same defect image pattern. Among grayscale values of the pixels of the defect image and the additional images, maximum grayscale value of the pixels is used for generating the first grayscale image, and minimum grayscale value of the pixels is used for generating the second grayscale image.

In an embodiment, the defect image and the additional images are the same size of M×N pixels. As for pixels (m, n) of the defect image and the additional images, there are grayscale values of these pixels. A maximum grayscale value among the grayscale values is selected, and the maximum grayscale value is used as grayscale value for pixel (m, n) of the first grayscale image. A minimum grayscale value among the grayscale values is selected, and the minimum grayscale value is used as grayscale value for pixel (m, n) of the second grayscale image. Pixels (m=1 to M, n=1 to N) of the first grayscale image are generated accordingly. Pixels (m=1 to M, n=1 to N) of the second grayscale image are generated as well. After generating the first grayscale image and the second grayscale image, the set of input data including the defect marked image, the first grayscale image and the second grayscale image is constructed.

In some embodiments, a plurality of sets of input data for training are prepared. Another training function includes a section for receiving the sets of input data for training and output labels based on the input data, and the defect determination model is trained after the another training function is executed with a main program.

Accordingly, the defect determination model for converting input images (including defect marked image, first grayscale image corresponding to the defect marked image and second grayscale image corresponding to the defect marked image) into information of the defect is trained after the training function is executed with a main program containing the contraction and expansion functions for the images.

In other words, after establishing the defect determination model 312, the defect determination model 312 can be applied to a defect marked image 252, a first grayscale image corresponding to the defect marked image 252, and a second grayscale image corresponding to the defect marked image 252 to generate information of the defect.

In some embodiments, third grayscale image may be introduced. Regarding pixels (m, n) of the defect image and the additional images, there are grayscale values of these pixels. A mean grayscale value among the grayscale values is selected, and the mean grayscale value is used as grayscale value for pixel (m, n) of a third grayscale image. Pixels (m=1 to M, n=1 to N) of the third grayscale image are generated accordingly. After generating the third grayscale image, the set of input data for training includes the defect marked image, the first grayscale image, the second grayscale image and the third grayscale image.

Further, after establishing the defect determination model 312, the defect determination model 312 can be applied to a defect marked image, a first grayscale image corresponding to the defect marked image, a second grayscale image corresponding to the defect marked image, a third grayscale image corresponding to the defect marked image, and generate information of the defect.

It shall be particularly appreciated that the processors mentioned in the above embodiments may be a central processing unit (CPU), other hardware circuit elements capable of executing relevant instructions, or combination of computing circuits that shall be well-appreciated by those skilled in the art based on the above disclosures. Moreover, the storage units mentioned in the above embodiments may be memories for storing data. Further, the image capturing devices may be a RSEM device and the defect inspection devices may be semiconductor wafer defect inspection equipment. However, it is not intended to limit the hardware implementation embodiments of the present disclosure.

Figure 4:
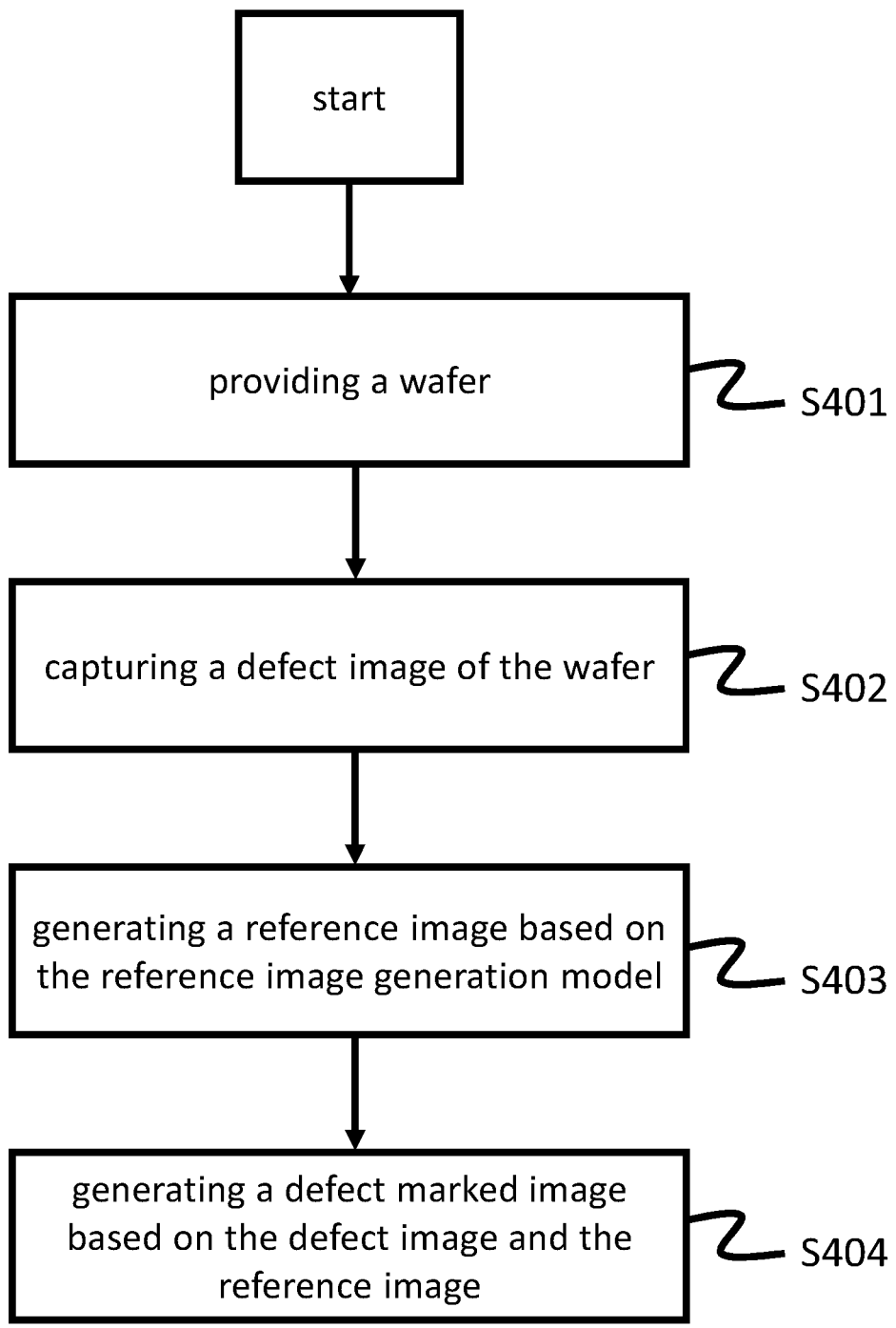
FIG. 4 is a flowchart diagram, in accordance with some embodiments of the present disclosure.

Some embodiments of the present disclosure include a method for scanning wafer, and a flowchart diagram thereof is as shown in FIG. 4. The method of some embodiments is implemented by a system (e.g., any one of the systems (1, 2 or 3) of the aforesaid embodiments). Detailed operations of the method are as follows.

Figure 6A:
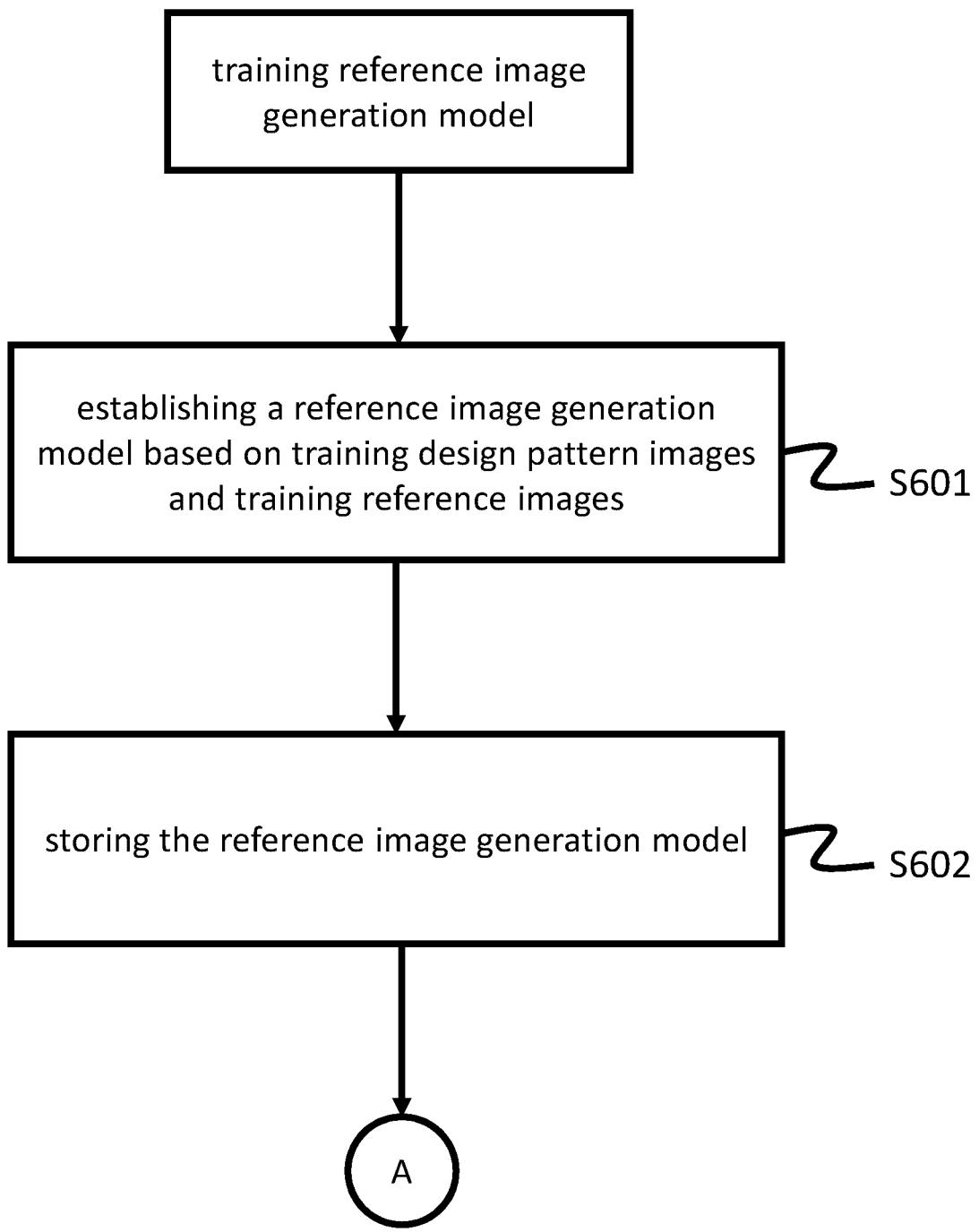
FIGS. 6A to 6C are flowchart diagrams, in accordance with some embodiments of the present disclosure.
Figure 7A:
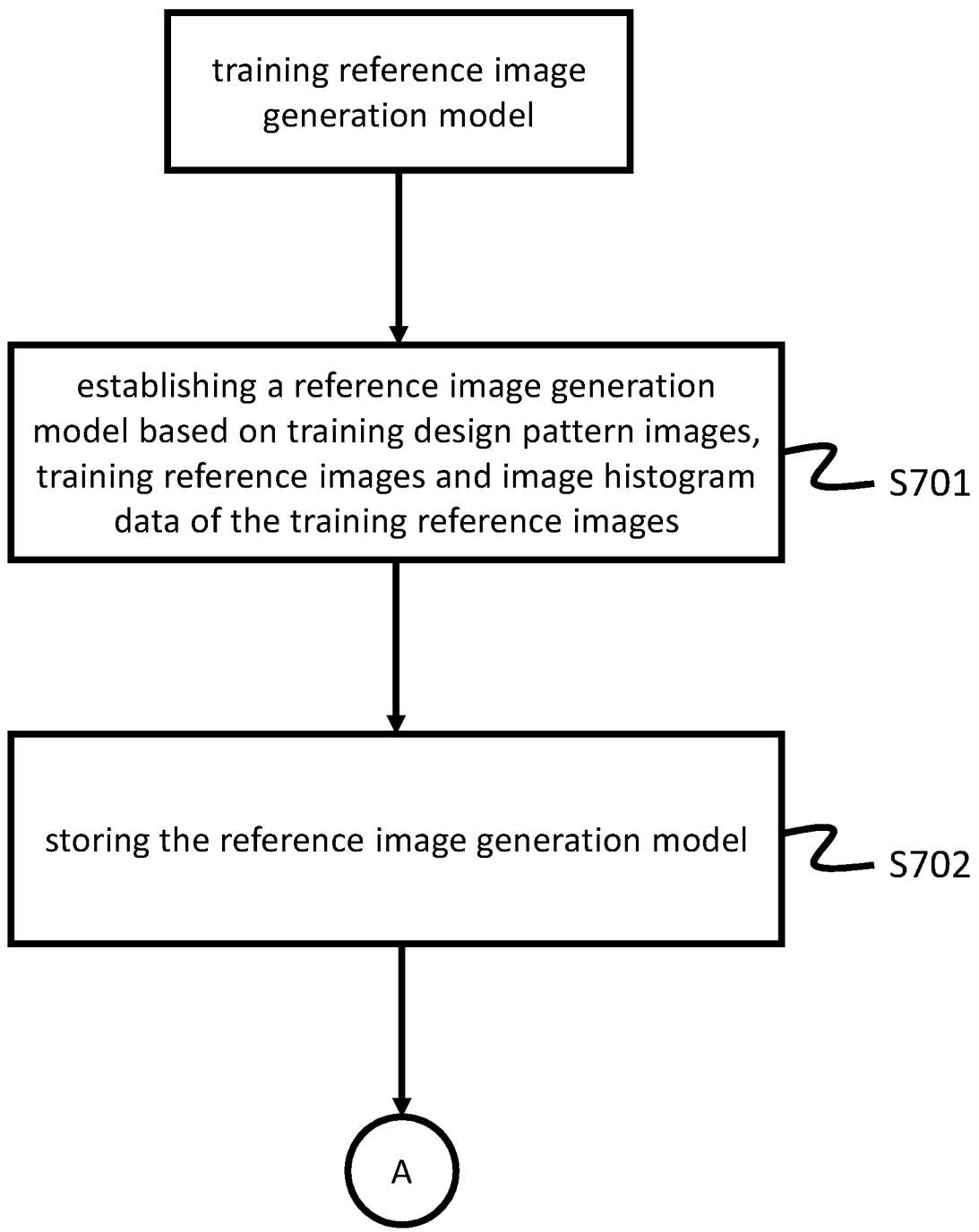
FIGS. 7A to 7D are flowchart diagrams, in accordance with some embodiments of the present disclosure.

Referring to FIG. 4, operation S401 is executed to provide a wafer. Operation S402 is executed to capture a defect image of the wafer containing a defect on the wafer. After capturing the defect image, operation S403 is executed to generate a reference image based on the reference image generation model. In operation S403, the reference image matches to the defect image. Accordingly, the defect image (i.e., image with defect of wafer) and the reference image are constructed. Operation S404 is executed to generate a defect marked image based on the defect image and the reference image. It should be note that the reference image generation model is established based on the aforesaid training embodiments (e.g., the embodiments of training model by the system 3) or the following embodiments (e.g., the embodiments of training model as shown in FIG. 6A or 7A).

Figure 5:
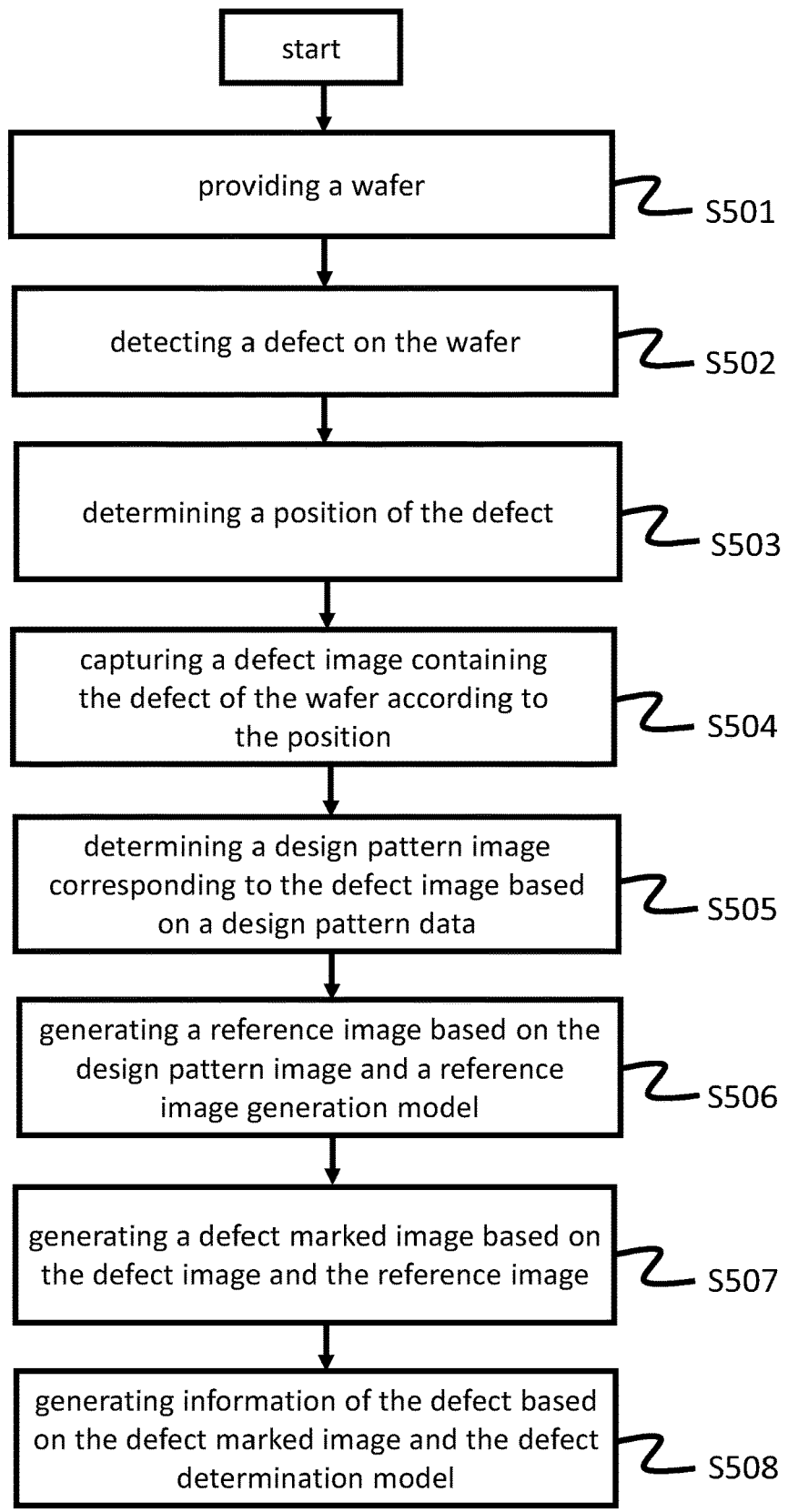
FIG. 5 is a flowchart diagram, in accordance with some embodiments of the present disclosure.

Some embodiments of the present disclosure include a method for scanning wafer, and a flowchart diagram thereof is as shown in FIG. 5. The method of some embodiments is implemented by a system (e.g., any one of the systems (1, 2 or 3) of the aforesaid embodiments). Detailed operations of the method are as follows.

Referring to FIG. 5, operation S501 is executed to provide a wafer. Operation S502 is executed to detect a defect on the wafer. Operation S503 is executed to determine a position of the defect (e.g., coordinates of the defect). Accordingly, after the position of the defect on the wafer is determined, operation S504 is executed to capture a defect image containing the defect of the wafer at the position. It should be noted that, the detection of the defect and determination of the position of the defect can be achieved based on the aforesaid embodiments (e.g., the embodiments of inspecting defect by the system 2 or the system 3).

Then, operation S505 is executed to determine a design pattern image from a design pattern data based on the defect image. It should be noted that, in some embodiments: (1) the design pattern data contains data of a design layout of the wafer (e.g., CAD layout of the wafer); and (2) the design pattern image and the defect image are images at the same region of the wafer. The design pattern image is an image of a design layout of the wafer, and the defect image is an image captured by a device.

Operation S506 is executed to generate a reference image based on the design pattern image and a reference image generation model. The design pattern image is converted into the reference image by the reference image generation model. The reference image generation model is a machine learning model. The design pattern image is given as the input data for the reference image generation model, and the subsequent output data from the reference image generation model is the reference image. In other words, the reference image generation model is applied to the design pattern image to generate the reference image.

After the reference image is generated, operation S507 is executed to generate a defect marked image based on the defect image and the reference image. In an embodiment, the defect marked image is derived by subtracting the defect image from the reference image. Operation S508 is executed to generate information of the defect of the wafer based on the defect marked image and the defect determination model. In an embodiment, the defect marked image is converted into the information of the defect by the defect determination model. The defect determination model is a machine learning model. The defect marked image is given as the input data for the defect determination model, and the subsequent output data from the defect determination model is the information of the defect. In other words, the defect determination model is applied to the defect marked image to generate the information of the defect.

Figure 6B:
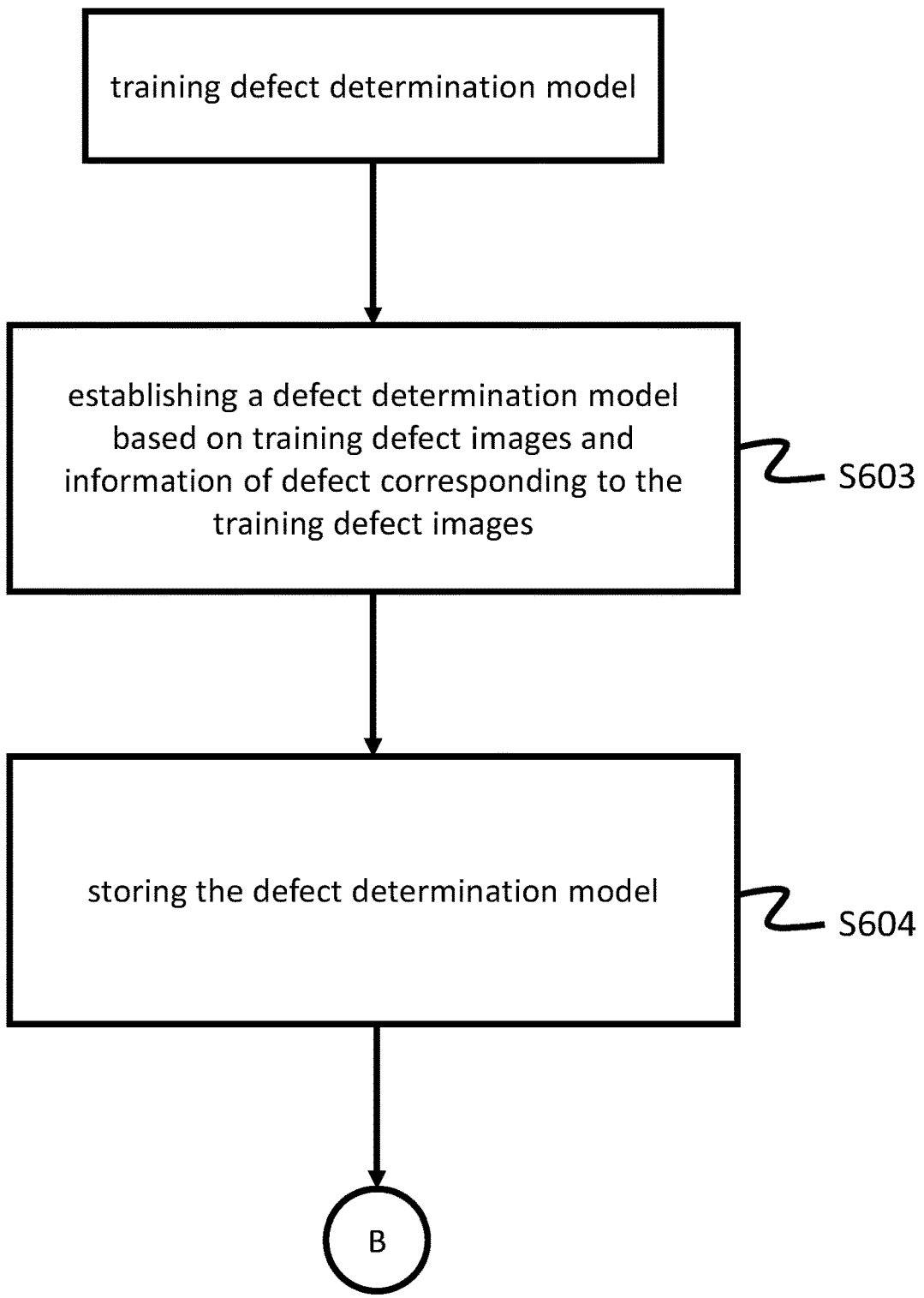
Figure 6C:
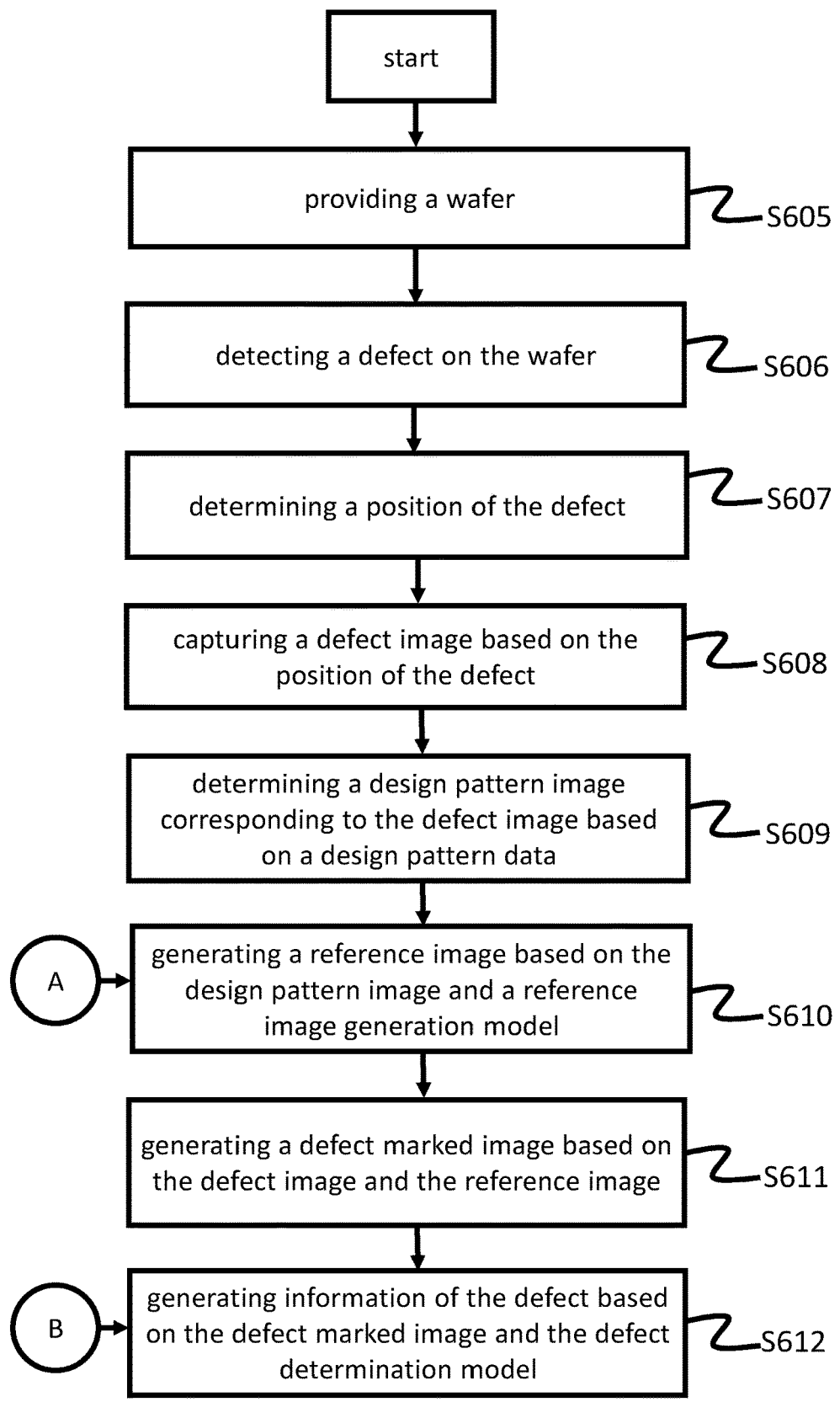

Some embodiments of the present disclosure include a method for scanning wafer, and flowchart diagrams thereof are as shown in FIGS. 6A to 6C. The method of some embodiments is implemented by a system (e.g., any one of the systems (1, 2 or 3) of the aforesaid embodiments). Detailed operations of the method are as follows.

FIG. 6A is the flowchart diagram showing a method of training a reference image generation model in accordance with some embodiments of the present disclosure. Because the reference image generation model is configured to convert a design pattern image into a reference image, operation S601 is executed to establish a reference image generation model based on a plurality of predetermined design pattern images (used as input data at training stage) and a plurality of predetermined reference images (used as output data at training stage) corresponding to the predetermined design pattern images.

In some embodiments, there is a training function for training reference image generation model. The training function includes a section for receiving the predetermined design pattern images as input data for training and the predetermined reference images as output data based on the input data. Therefore, the reference image generation model for converting design pattern images (input data for training) into reference images (output data) is trained after the training function is executed with a main program containing the contraction and expansion functions for the images.

The predetermined reference images used for training the reference image generation model in some embodiments are images captured by a device and matched with the predetermined design pattern images. After establishing the reference image generation model, operation S602 is executed to store the reference image generation model for later use.

FIG. 6B is the flowchart diagram showing a method of training a defect determination model. Because the defect determination model is configured to convert predetermined defect marked image into predetermined information of defect, operation S603 is executed to establish a defect determination model based on a plurality of predetermined defect marked images and predetermined information of defect corresponding to the predetermined defect marked images.

In some embodiments, there is a training function for training defect determination model. The training function includes a section for receiving the predetermined defect marked images as input data for training and the predetermined information of defect as output data based on the input data. Therefore, the defect determination model for converting the predetermined defect marked images (input data) into the predetermined information of defect (output data) is trained after the training function is executed with a main program containing the contraction and expansion functions for the images. After establishing the defect determination model, operation S604 is executed to store the defect determination model for later use.

FIG. 6C is the flowchart diagram showing a method of determining defect on wafer. After training the reference image generation model and the defect determination model with sufficient data, the reference image generation model and the defect determination model are established, operation S605 is executed to provide a wafer. Operation S606 is executed to detect a defect on the wafer. Operation S607 is executed to determine a position of the defect (e.g., coordinates of the defect). Accordingly, after the position of the defect on the wafer is determined, operation S608 is executed to capture a defect image containing the defect of the wafer according to the position. It should be noted that, the detection of the defect and determination of the position of the defect can be achieved based on the aforesaid embodiments (e.g., the embodiments of inspecting defect by the system 2 or the system 3).

Then, operation S609 is executed to determine a design pattern image from a design pattern data based on the defect image. It should be noted that, in some embodiments: (1) the design pattern data contains the information of a design layout of the wafer (e.g., CAD layout of the wafer); and (2) the design pattern image and the defect image are images at the same region of the wafer. The design pattern image is a design layout, and the defect image is an image captured by a device.

Next, operation S610 is executed to generate a reference image based on the design pattern image and the reference image generation model. The design pattern image is converted into the reference image by the reference image generation model. The reference image generation model is a machine learning model. The design pattern image is given as the input data for the reference image generation model, and the subsequent output data from the reference image generation model is the reference image. In other words, the reference image generation model is applied to the design pattern image to generate the reference image.

After the reference image is generated, operation S611 is executed to generate a defect marked image based on the defect image and the reference image. In some embodiments, the defect marked image is derived by subtracting the defect image from the reference image. Operation S612 is executed to generate information of the defect of the wafer based on the defect marked image and the defect determination model. In detail, the defect marked image is converted into the information of the defect by the defect determination model. The defect determination model is a machine learning model. The defect marked image is given as the input data for the defect determination model, and the subsequent output data from the defect determination model is the information of the defect. In other words, the defect determination model is applied to the defect marked image to generate the information of the defect.

Some embodiments of the present disclosure include a method for scanning wafer, and flowchart diagrams thereof are as shown in FIGS. 7A to 7D. The method of some embodiments is implemented by a system (e.g., any one of the systems (1, 2 or 3) of the aforesaid embodiments). Detailed operations of the method are as follows.

FIG. 7A is the flowchart diagram showing a method of training a reference image generation model. The reference image generation model is configured to convert a design pattern image into a reference image, operation S701 is executed to establish a reference image generation model based on a plurality of predetermined design pattern images (used as input data at training stage), a plurality of predetermined reference images (used as output data at training stage) based on the predetermined design pattern images and a plurality of image histogram data (used as input data at training stage) of the predetermined reference images.

In some embodiments, there is a training function for training reference image generation model. The training function includes a section for receiving the predetermined design pattern images and the predetermined image histogram data (input data), and receiving the predetermined reference images (output data). Therefore, the reference image generation model is trained after the training function is executed with a main program containing the contraction and expansion functions for the images.

The predetermined reference images used for training the reference image generation model in some embodiments are images captured by a device and matched with the predetermined design pattern images. After establishing the reference image generation model, operation S702 is executed to store the reference image generation model for later use.

Figure 7B:
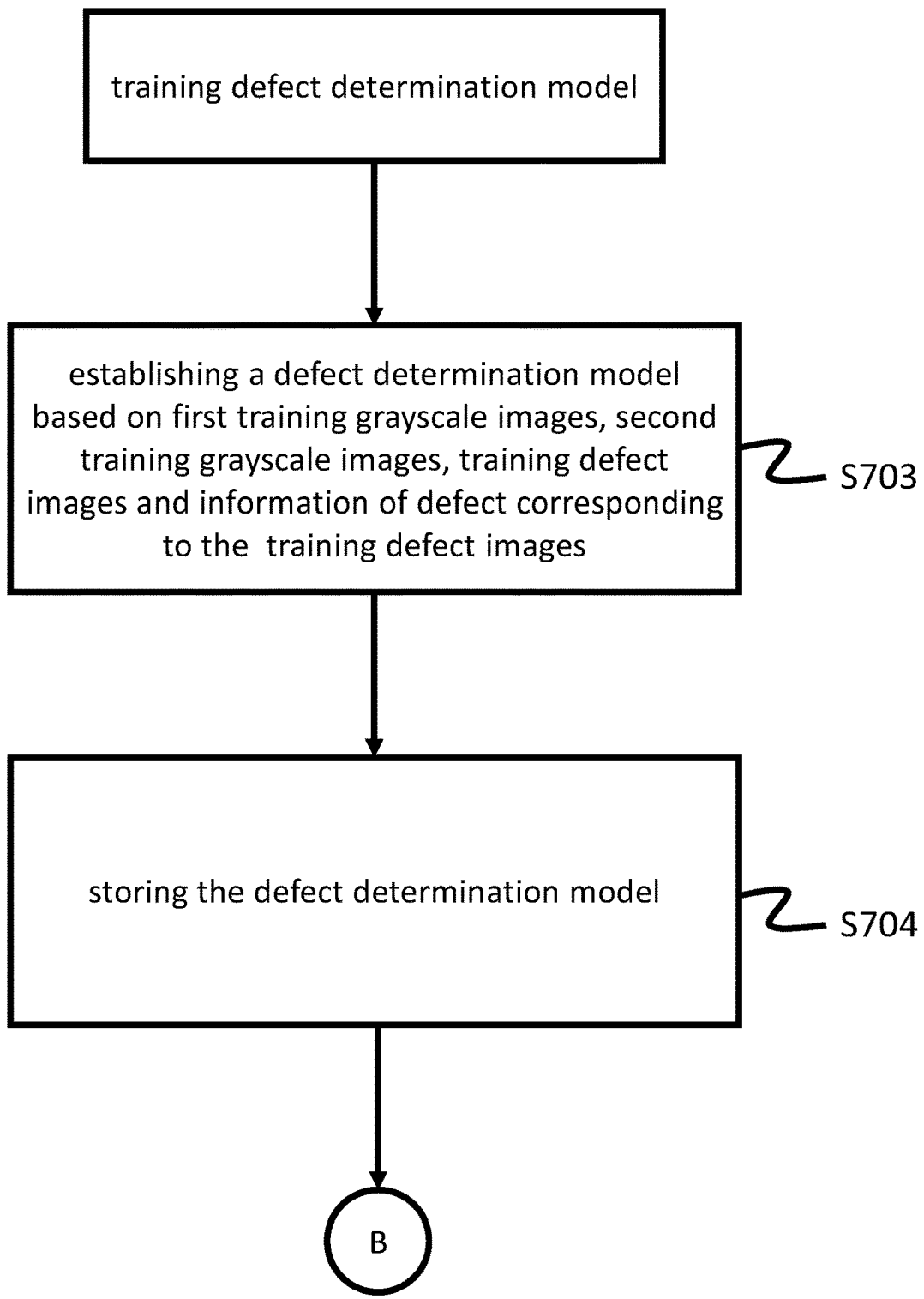

FIG. 7B is the flowchart diagram showing a method of training a defect determination model. The defect determination model is configured to convert defect marked image and grayscale images corresponding to the defect marked image into information of defect, operation S703 is executed to establish a defect determination model based on a plurality of predetermined defect marked images, a plurality of first predetermined grayscale images corresponding to the predetermined defect marked images, a plurality of second predetermined grayscale images corresponding to the predetermined defect marked images, and the predetermined information of defect corresponding to the predetermined defect marked images.

In some embodiments, there is a training function for training defect determination model. The training function includes a section for receiving the first predetermined grayscale images, the second predetermined grayscale images and the predetermined defect marked images as input data for training, and receiving the predetermined information of defect as output data based on the input data. Therefore, the defect determination model is trained after the training function is executed with a main program containing the contraction and expansion functions for the images. It should be noted that, the generations of the first predetermined grayscale images and the second predetermined grayscale images can be implemented based on the aforesaid embodiments (e.g., the embodiments of generating first predetermined grayscale image and second predetermined grayscale image by the system 3). After establishing the defect determination model, operation S704 is executed to store the defect determination model for later use.

Figure 7C:
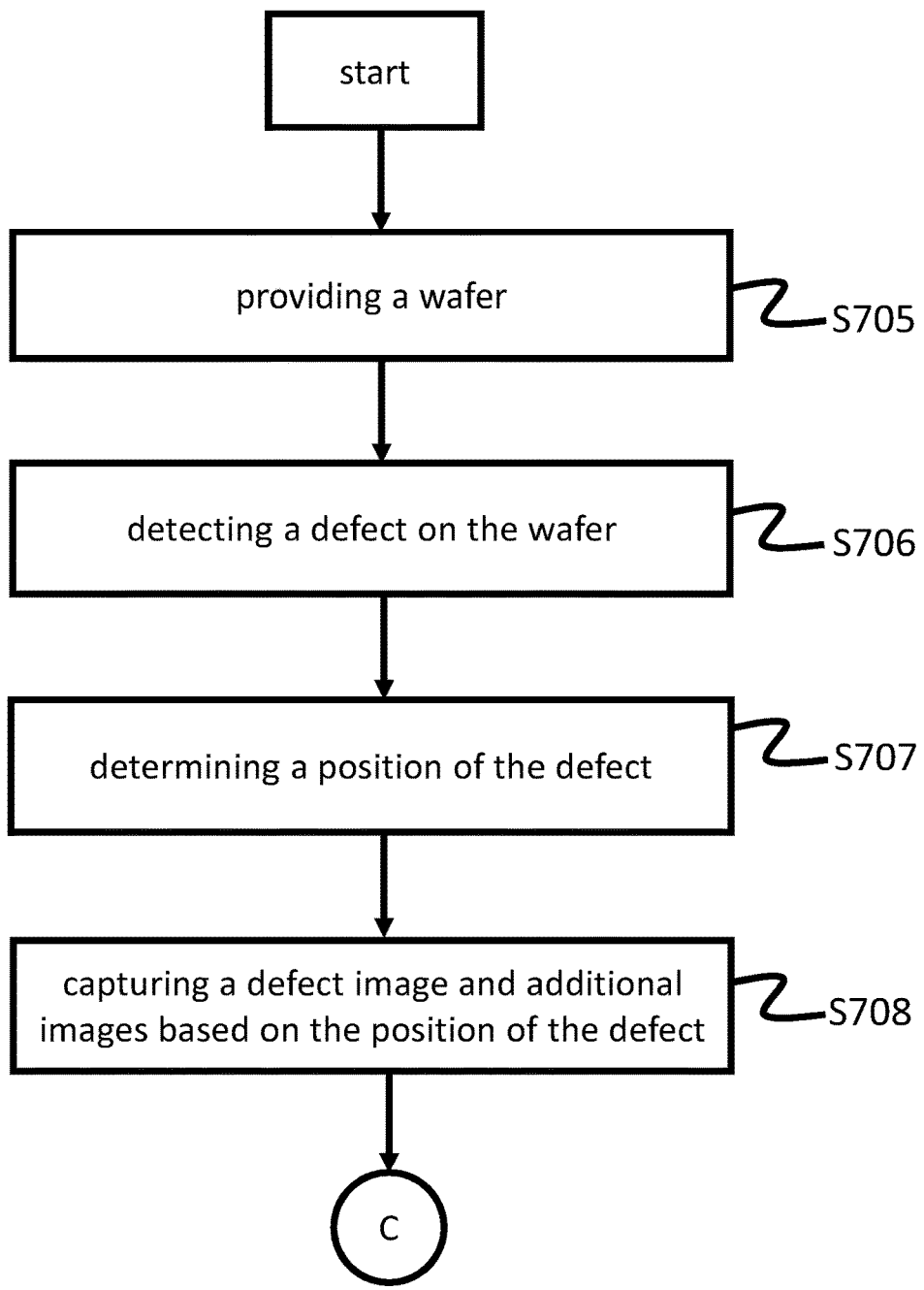
Figure 7D:
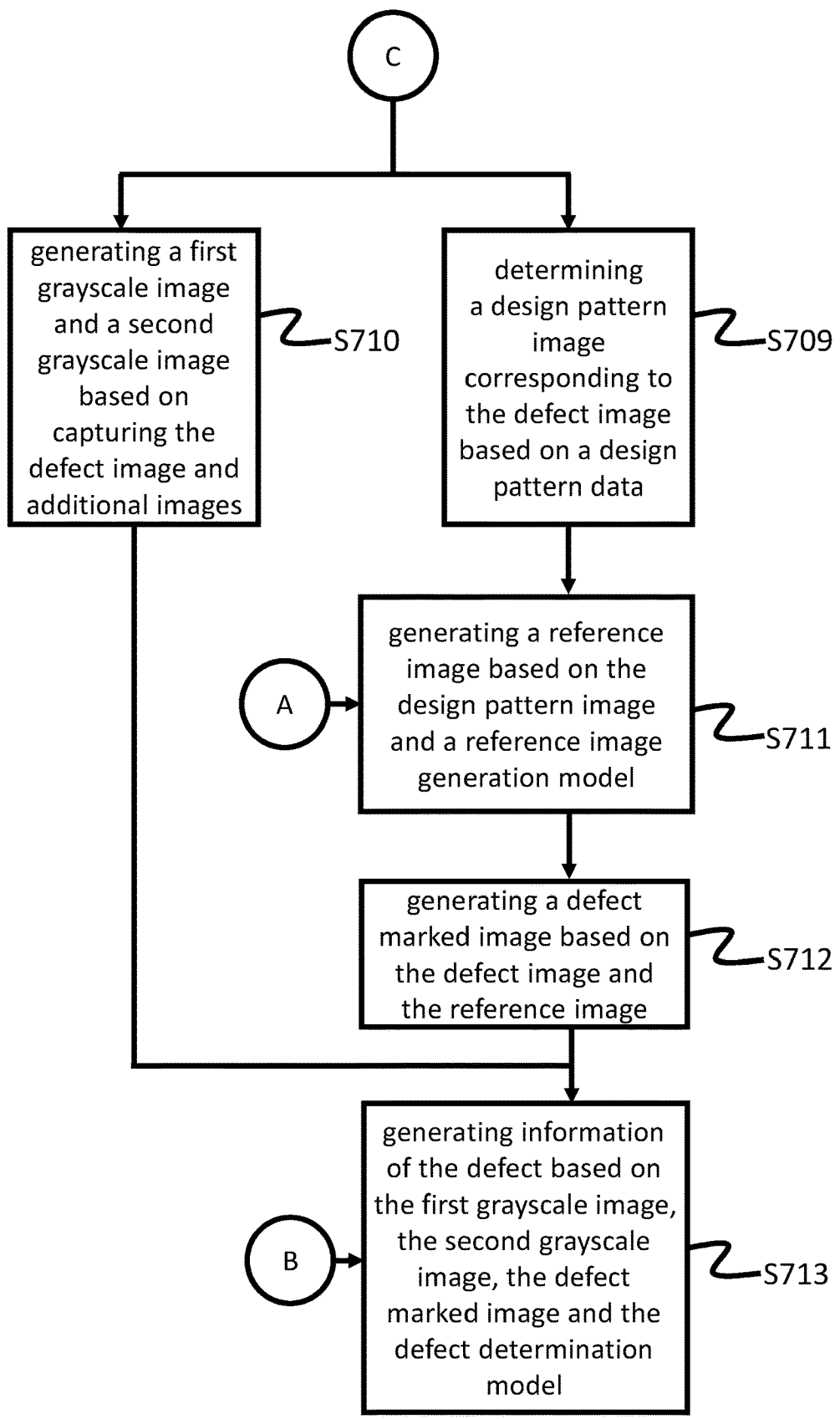

FIGS. 7C to 7D are the flowchart diagrams showing a method of determining defect. After training the reference image generation model and the defect determination model with sufficient data, the reference image generation model and the defect determination model are established, operation S705 is executed to provide a wafer. Operation S706 is executed to detect a defect on the wafer. Operation S707 is executed to determine a position of the defect (e.g., coordinates of the defect). It should be noted that, the detection of the defect and determination of the position of the defect may be achieved based on the aforesaid embodiments (e.g., the embodiments of inspecting defect by the system 2 or the system 3).

Accordingly, after the position of the defect on the wafer is determined, operation S708 is executed to capture a defect image and additional images according to the position. Each of the defect image and the additional images contains the defect of the wafer. It should be note that the defect image and the additional images can be derived based on the aforesaid embodiments (e.g., the embodiments of obtaining defect image and additional images by the system 3).

Operation S709 is executed to determine a design pattern image based on the defect image and a design pattern data. It should be noted that, in some embodiments: (1) the design pattern data contains the information of a design layout of the wafer (e.g., layout of the wafer in CAD format); and (2) the design pattern image and the defect image are images at the same region of the wafer. The design pattern image is a design layout, and the defect image is an image captured by a device. In some embodiments, operations S710 generates a first grayscale image and a second grayscale image based on the defect image and the additional images (captured upon the operation S708). In some embodiments, the operation S710 and the operation 709 are performed simultaneously.

Operation S711 is executed to generate a reference image based on the design pattern image and the reference image generation model. The design pattern image is converted into the reference image by the reference image generation model. The reference image generation model is a machine learning model. The design pattern image is given as the input data for the reference image generation model, and the subsequent output data is the reference image. In other words, the reference image generation model is applied to the design pattern image to generate the reference image. In some embodiments, the operation S710 and the operation S711 are performed simultaneously.

After the reference image is generated, operation S712 is executed to generate a defect marked image based on the defect image and the reference image. In some embodiments, the defect marked image is derived by subtracting the defect image from the reference image. In some embodiments, the operation S710 and the operation S712 are performed simultaneously.

Operation S713 is executed to generate information of the defect of the wafer based on the first grayscale image, the second grayscale image, the defect marked image and the defect determination model. In detail, the first grayscale image, the second grayscale image and the defect marked image are converted into the information of the defect by the defect determination model. The defect determination model is a machine learning model. The first grayscale image, the second grayscale image and the defect marked image are given as the input data for the defect determination model, and the subsequent output data from the defect determination model is the information of the defect. In other words, the defect determination model is applied to the first grayscale image, the second grayscale image and the defect marked image to generate the information of the defect.

The defect determination method described in each of the above embodiments may be implemented by a computer programs including a plurality of codes. The computer program is stored in a non-transitory computer readable storage medium. When the computer programs loaded into an electronic computing apparatus (e.g., the defect determination system mentioned in the above embodiments), the computer program executes the defect determination method as described in the above embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage media with the same function and well known to those of ordinary skill in the art.

Some embodiments of the present disclosure provide a method for scanning wafer. The method includes the operations of: providing a wafer; capturing a first defect image of the wafer; generating a first reference image corresponding to the first defect image based on a reference image generation model; and generating a defect marked image based on the first defect image and the first reference image.

Some embodiments of the present disclosure provide a method for scanning wafer. The method includes the operations of: obtaining an image of a wafer, wherein the image comprises a defect of the wafer; generating a first design pattern image corresponding to the image; applying a reference image generation model to the first design pattern image to generate a first reference image; and deriving a first defect marked image by comparing the image and the first reference image.

Some embodiments of the present disclosure provide a system for scanning wafer. The system includes a storage unit, an image capturing device and a processor. The processor is connected to the storage unit and the image capturing device electrically. The storage unit stores a reference image generation model. The image capturing device captures a defect image of a wafer. The processor: inputs the image of the wafer to the reference image generation model for outputting a reference image; and processes the image and the reference image for deriving a defect marked image.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method, comprising:
   providing a wafer;
   capturing a defect image of part of the wafer;
   determining a clipped image, which corresponds to the defect image, of a first design pattern image based on a design pattern data;
   generating a first reference image corresponding to the defect image based on the clipped image and a reference image generation model; and
   generating a first defect marked image based on the defect image and the first reference image.

2. The method of claim 1, further comprising:
   detecting a defect of the wafer; and
   determining a position of the defect;
   wherein the defect image is captured according to the position of the defect.

3. The method of claim 1, further comprising:
   establishing the reference image generation model based on at least one second design pattern image and at least one second reference image corresponding to the at least one second design pattern image.

4. The method of claim 1, further comprising:
determining a first image histogram data of the defect image;
wherein the first reference image is generated based on the first design pattern image, the first histogram image data and the reference image generation model.

5. The method of claim 4, further comprising:
establishing the reference image generation model based on at least one second design pattern image, at least one second reference image corresponding to the at least one second design pattern image, and at least one second image histogram data of the at least one second reference image.

6. The method of claim 1, further comprising:
generating information of the defect of the wafer based on the first defect marked image and a defect determination model.

7. The method of claim 6, further comprising:
establishing the defect determination model based on at least one second defect marked image and information of defect corresponding to the at least one second defect marked image.

8. The method of claim 6, further comprising:
generating a first grayscale image and a second grayscale image based on capturing the defect image;
wherein the information of the defect of the wafer is generated based on the first defect marked image, the first grayscale image, the second grayscale image and the defect determination model.

9. The method of claim 8, further comprising:
establishing the defect determination model based on at least one second defect marked image, at least one third grayscale image corresponding to the at least one second defect marked image, at least one fourth grayscale image corresponding to the at least one second defect marked image, and information of defect corresponding to the at least one second defect marked image.

10. A method comprising:
obtaining an image of part of a wafer, wherein the image comprises a defect of the wafer;
generating a clipped image, which corresponds to the image, of a first design pattern image based on a design pattern data;
applying a reference image generation model to the clipped image of the first design pattern image to generate a first reference image corresponding to the image of the wafer; and
deriving a first defect marked image by comparing the image and the first reference image.

11. The method of claim 10, wherein the reference image generation model is trained based on a machine learning scheme with training data of a plurality of second design pattern images and a plurality of second reference images corresponding to the plurality of second design pattern images.

12. The method of claim 10, further comprising:
scanning the wafer for detecting the defect;
determining a position of the defect;
capturing the image based on the position of the defect.

13. The method of claim 10, wherein generating the clipped image of the first design pattern image further comprises:
comparing the image with a design layout of the wafer;
generating the clipped image of the first design pattern image by matching the image with part of the design layout.

14. The method of claim 10, wherein deriving the first marked image further comprises:
deriving the first defect marked image by subtracting the image from the first reference image.

15. The method of claim 10, further comprising:
applying a defect determination model to the first defect marked image to generate information of the defect of the wafer.

16. The method of claim 15, wherein the defect determination model is trained based on a machine learning scheme with training data of a plurality of second defect marked image and information of defect which correspond to the plurality of second defect marked image.

17. A system, comprising:
a storage unit, being configured to store a reference image generation model;
an image capturing device, being configured to capture an image of part of a wafer; and
a processor, being connected to the storage unit and the image capturing device electrically and configured to:
generate a clipped image, which corresponds to the image, a first design pattern image based on a design pattern data;
input the first design pattern image to the reference image generation model for outputting a reference image corresponding to the image of the wafer; and
process the image of the wafer and the reference image for deriving a defect marked image.

18. The system of claim 17, further comprising:
a defect inspection device, being connected to the processor electrically and configured to scan the wafer for detecting a defect of the wafer, wherein the image comprises the defect.

19. The system of claim 17, wherein the storage unit is further configured to store a defect determination model, and the processor is further configured to input the defect marked image to the defect determination model and output information of the defect of the wafer from the defect determination model based on the defect marked image.

20. The system of claim 17, wherein the processor is further configured to:
establish the reference image generation model based on a plurality of second design pattern images and a plurality of reference image corresponding to plurality of second design pattern images.

* * * * *